United States Patent [19]
Evans et al.

[11] 4,397,490
[45] Aug. 9, 1983

[54] LOW PROFILE BUMPER

[75] Inventors: William J. Evans, Redford Township, Wayne County; Charles Haddad, West Bloomfield, both of Mich.

[73] Assignee: Ford Motor Company, Dearborn, Mich.

[21] Appl. No.: 260,524

[22] Filed: May 4, 1981

[51] Int. Cl.³ .............................................. B60R 19/08
[52] U.S. Cl. ................................... 293/120; 293/135; 293/143
[58] Field of Search ............... 293/102, 103, 108, 120, 293/122, 121, 131, 132, 134, 135, 112, 113, 115, 126, 143, 145; 296/1 S, 188, 204, 205

[56] References Cited

U.S. PATENT DOCUMENTS

| | | | |
|---|---|---|---|
| 2,329,874 | 9/1943 | Cadwallader et al. | 293/115 |
| 3,655,231 | 4/1972 | Killea | 293/132 |
| 3,827,740 | 8/1974 | Golze et al. | 293/120 |
| 3,856,344 | 12/1974 | Loeber | 296/204 |
| 3,883,168 | 5/1975 | Goupy et al. | 293/120 |
| 3,884,516 | 5/1975 | Gallion et al. | 293/120 |
| 4,029,350 | 6/1977 | Goupy et al. | 293/122 |
| 4,045,075 | 8/1977 | Pulver | 296/205 |
| 4,186,915 | 2/1980 | Zeller et al. | 293/120 |
| 4,252,355 | 2/1981 | Goupy et al. | 293/120 |
| 4,348,042 | 9/1982 | Scrivo | 293/122 |

FOREIGN PATENT DOCUMENTS 2255277  5/1974  Fed. Rep. of Germany ...... 293/120

OTHER PUBLICATIONS

SAE Paper 740061, Kerr, The General Motors Hydraulic-Pneumatic Energy Absorber Applied to 1974 Bumper Systems, pp. 1–5, 2/25/74.
SAE Paper 730030, Golze et al., Bumper Design, Materials, and Fabrication, 1/8/73.
SAE J980a, SAE Recommended Practice, Bumper Evaluation Test Procedure-Passenger Cars, Jul. 1971.

Primary Examiner—Robert R. Song
Assistant Examiner—Dennis Pedder
Attorney, Agent, or Firm—John J. Roethel; Daniel M. Stock; Clifford L. Sadler

[57] ABSTRACT

A vehicle bumper that incorporates a "C" section face bar attached to a truss-formed backplate to achieve a box section construction. The face bar, although a conventional "C" section, has more nearly horizontal upper and lower shelves combined with a reduced frontal face height to offer, when further combined with the backplate, a nearly square box beam. Functional height is extended beyond the beam section with a plurality of strategically located underride stops drawn from the lower shelf. These stops provide low pendulum impact performance at minimal weight while facilitating forming of the bumper beam ends. The stops preferably are concealed with a flexible shield which provides conventional appearance in addition to opportunities of cost, weight, airflow and model appearance differentiation when replacing separate air deflectors and sight shields. The bumper assembly configuration provides a highly weight efficient section modulus, improved torsional stiffness and improved dent resistance. Additional dent resistance preferably is provided in the center area with an internal reinforcing doubler plate.

9 Claims, 10 Drawing Figures

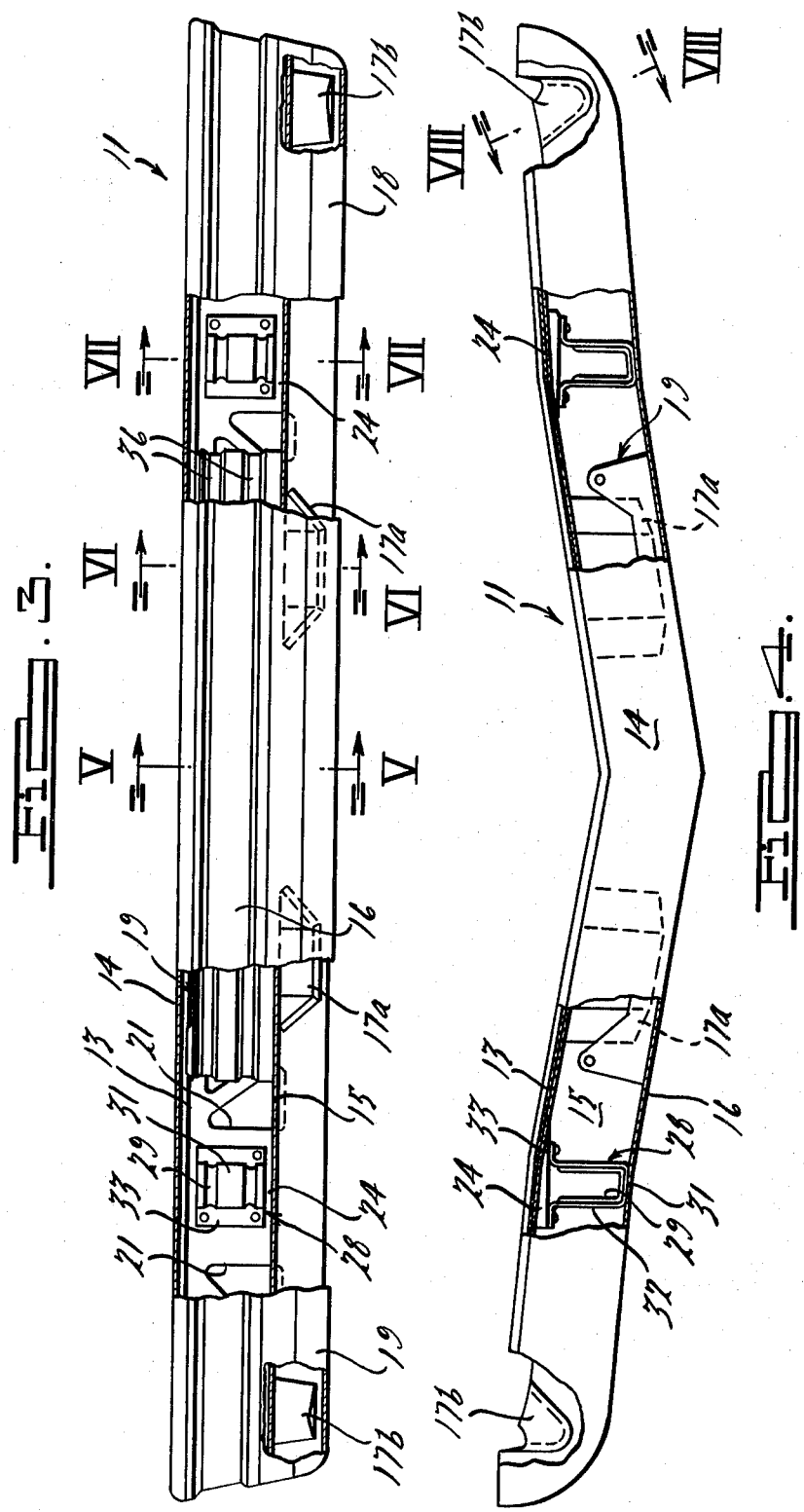

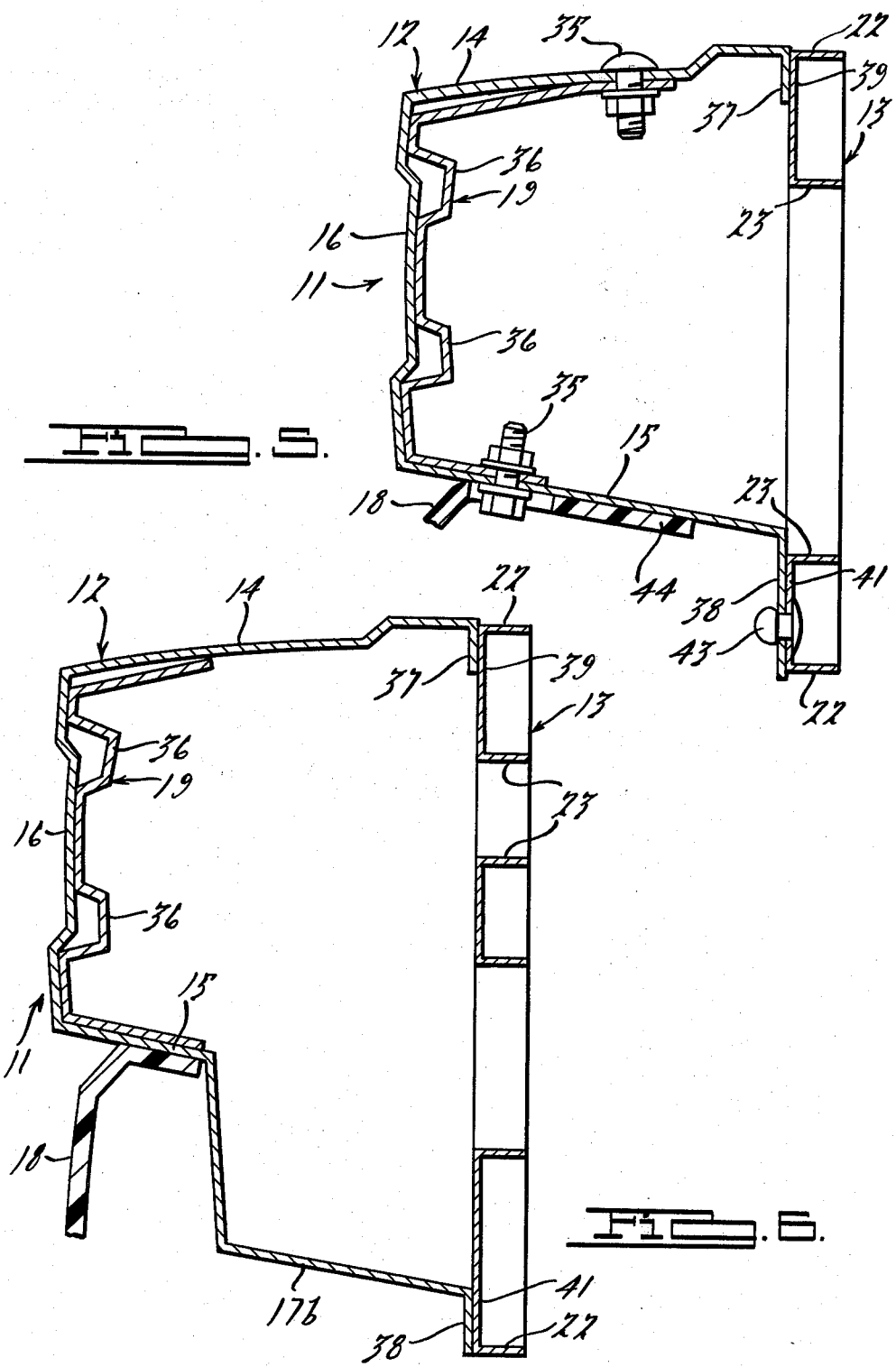

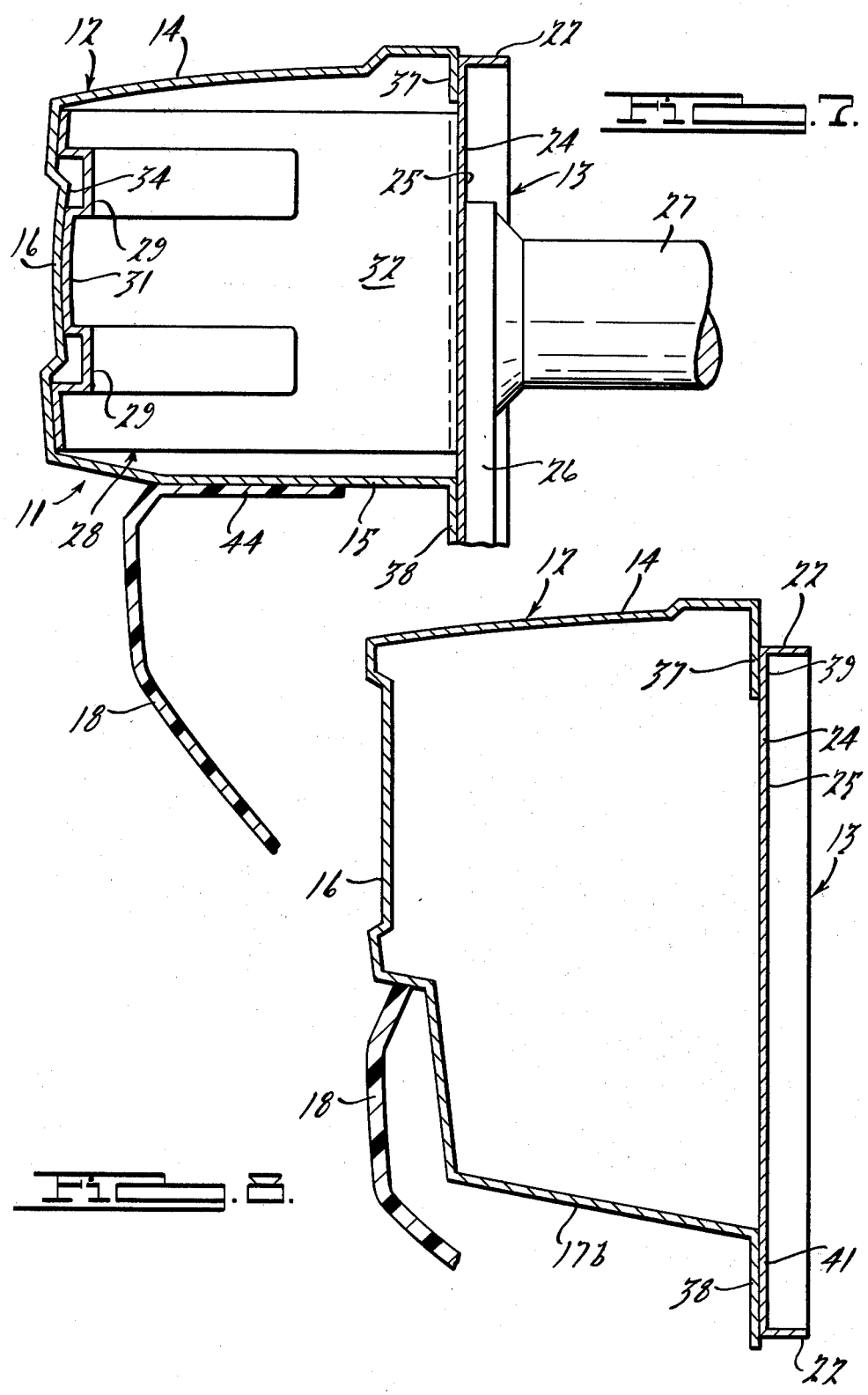

LOW PROFILE BUMPER

BACKGROUND OF THE INVENTION

As discussed in U.S. Pat. No. 3,827,740 issued Aug. 6, 1974 to Richard R. Golze et al for a "Structurally Reinforced Vehicle Bumper", it is well known to form an external bumper member so that it has a generally rectangular or box-shaped cross section. It was further pointed out that the "structural strength, and hence the deformation resistance, of the box-shaped bumper greatly may be increased by the addition of a reinforcing member extending from the inner surface of the outermost bumper wall that will be impacted as during a minor vehicle collision and the wall of the bumper opposite the impact wall."

Since the aforementioned patent issued in 1974, there have been radical changes in automobile vehicle design parameters. Fuel efficient automobiles have become the objective of all automobile manufacturers. One way to increase miles per gallon is to reduce the weight of the vehicle components. Vehicle bumpers in particular have been prime candidates for weight reduction programs. It is, therefore, inconsistent with weight reduction objectives to seek increased structural strength by the addition of reinforcing members to a bumper structure.

It has been suggested that aluminum alloys be substituted for the cold rolled steel from which bumpers conventionally have been fabricated. Although aluminum bumpers weigh less than comparable steel bumpers, a substantial cost penalty is incurred with the use of aluminum alloys. High strength, low alloy steels also have been suggested as well as the use of fiberglass plastic materials.

An analytical approach to bumper system design has established the following considerations that must be satisfied appearance, cost, weight, performance, design flexibility, aerodynamics, engine cooling capacity and manufacturability within current capabilities of the manufacturer. Steel remains the prefered material for meeting the desideratum in bumper design and manufacturing feasibility.

Application of an analytical approach results in a bumper that represents an improvement over known high strength, low alloy, lightweight steel bumpers. The bumper system is one that has reduced assembly complexity, reduced weight and reduced cost.

SUMMARY OF THE INVENTION

The invention relates to a vehicle bumper having a "C" section face bar attached to a truss-formed backplate. The face bar has substantially horizontal upper and lower shelves of a width slightly in excess of the frontal face height of the face bar and of the backplate. When assembled, the face bar and backplate form a substantially square box beam.

An important feature comprises a plurality of underride stops drawn from the lower shelf to vertically extend the impact functional height of the beam. The stops provide low pendulum impact performance at minimal weight addition to the bumper. A flexible shield at the front of the bumper conceals at least the underride stops to provide for minimal airflow disturbance over the bumper.

Preferably, an internal reinforcing doubler plate is mounted internally of the face bar front face panel to provide high dent resistance in the center frontal area of the bumper.

DESCRIPTION OF THE DRAWING

Other features, advantages and objects of the present invention will become more apparent as the description proceeds, reference being had to the accompanying drawings, wherein

FIG. 3 is a front view of the bumper system with the front face of the face bar cut away to reveal the internal structure of the system;

FIG. 4 is a plan view of FIG. 3;

FIG. 5 is a section view taken on the line 5—5 of FIG. 3;

FIG. 6 is a section view taken on the line 6—6 of FIG. 3;

FIG. 7 is a section view taken on the line 7—7 of FIG. 3;

FIG. 8 is a section view taken on the line 8—8 of FIG. 4;

DETAILED DESCRIPTION OF THE INVENTION

Figure 1:
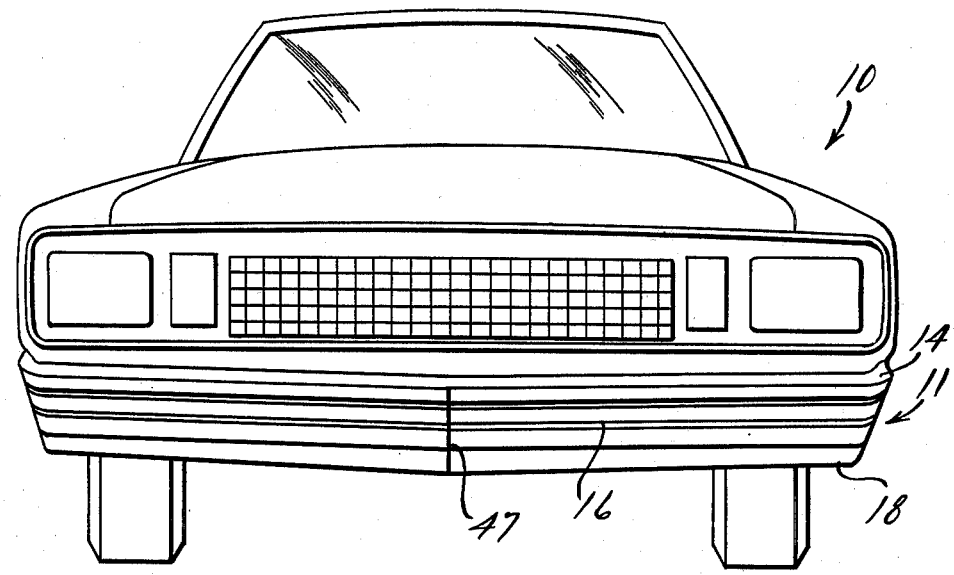
FIG. 1 is a front end view of an automobile on which the bumper system embodying the present invention is adapted to be mounted.

Referring now to the drawings, FIG. 1 shows the front end of an automobile 11 having a bumper assembly 11 mounted thereon. Although the front end of the vehicle, and therefore the front bumper, is shown, it will become apparent that the construction of the disclosed bumper assembly is applicable to both the front and rear bumpers of the automobile.

Figure 2:
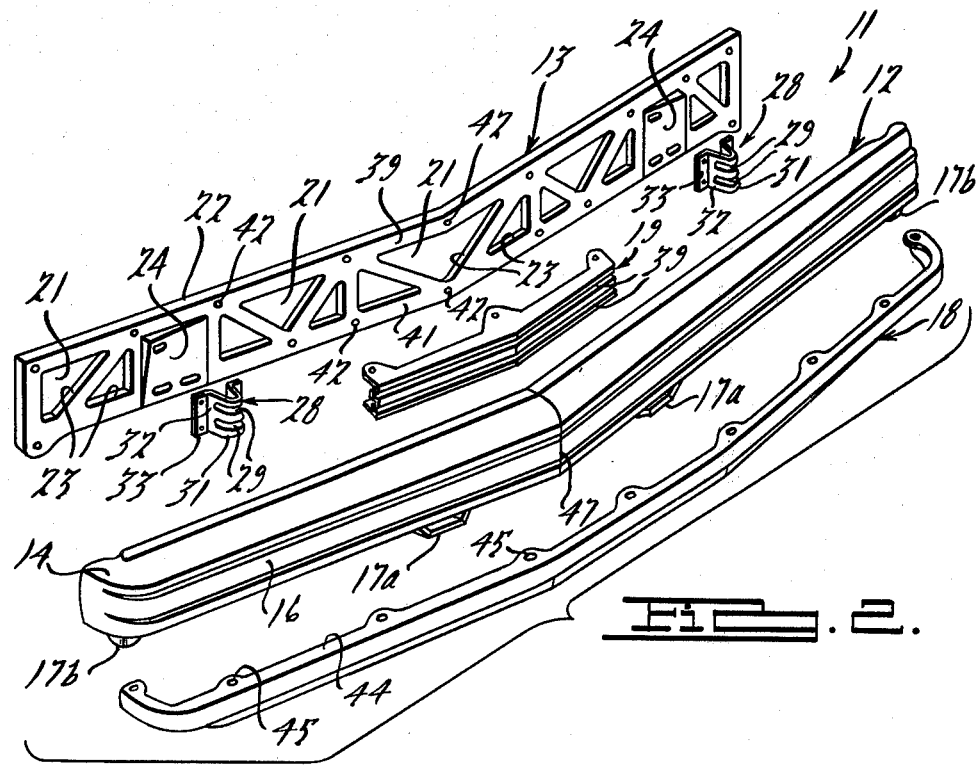
FIG. 2 is an exploded perspective view of major components of the bumper system.

In FIG. 2 there is shown in an exploded view the several structural components utilized to form a preferred embodiment of the bumper assembly embodying the present invention. The bumper assembly incorporates a stamped "C" section face bar 12 attached to a stamped steel backplate 13 to achieve an all steel box section beam. The face bar 12, although a substantially conventional "C" section, has substantially horizontal upper 14 and lower 15 shelves that are combined with a frontal face panel 16. The face panel 16 is of reduced height compared to conventional bumpers in current use.

When the face bar 12 is combined with the backplate 13, the box beam formed is substantially square shaped, resulting in a beam of reduced weight having improved beam strength, torsional stiffness and dent resistance. Dent resistance is a measure of the resistance caused by a vehicle front bumper to airflow into the vehicle engine compartment. The reduced structural beam face height provides an engine cooling advantage over many conventional bumper designs.

Functional impact height of the bumper is extended beyond the beam section with strategically placed underride stops 17 drawn from the lower shelf 15. Preferably, there are four of the underride stops 17, the number of stops being related to the length of a standardized test pendulum, as will be more fully explained.

The stops 17 preferably are concealed behind a flexible shield 18 that is substantially equal in length to the face bar 12. The flexible shield 18 provides a conventional appearance to the bumper assembly as well as providing opportunities for cost, weight, airflow and model differentiation when used as alternates to separate air deflectors and sight shields.

The bumper assembly construction and arrangement as generally described provides a highly weight efficient section modulus, improved torsional resistance and improved dent resistance. Since dent resistance is related to metal thickness, additional dent resistance is provided in the center area of the face bar face panel 16 with an internal reinforcing doubler plate 19.

As best seen in FIGS. 2 and 6, the backplate 13 is en elongated stamped member in the form of a truss. It has a series of substantially triangular apertures 21 of varying sizes extending from one end to the other. The backplate 13 has a peripheral flange 22 extending around its perimeter an each of the apertures 21 is similarly provided with a peripheral flange 23 around its edges.

Inwardly of each of its side edges, the backplate 13 has an attachment pad 24. Each attachment pad 24 is adapted to receive on its exposed rear face 25 a foot piece 26 attached to the end of a strut or energy absorber piston rod 27 (see FIG. 7) that is part of an energy absorption device supported on an automobile structural or frame member (not shown).

On its interior side, the side visible in FIG. 2, each attachment pad 24 has mounted thereon a spacer member 28 having a substantially U-shaped cross-section when viewed from the top. The spacer members 28 are of limited deformability. Each spacer member has a pair of vertically spaced, horizontally extending, depressed rib formations 29 that extend across the base 31 of the spacer and partially down each side leg 32. The side legs 32 terminate in outwardly turned flanges 33 adapted to receive bolts, rivets or the like for mounting the spacers on the support pads 24. When in assembled relation, as shown in FIG. 7, the spacers 28 extend from the backplate 13 into abutting relation to the inner face 34 of the front face panel 16 of the front bar 12.

The doubler plate 19 is C-shaped and complementarily fits within the C-section face bar at the center area of the latter between the attachment pads 24. The doubler plate 19 is secured to the face bar upper shelf 14 and lower shelf 15, preferably by bolts 35 (see FIG. 5) or other fasteners. Longitudinally extending rib formations 36 in the vertical face of the doubler plate provide additional resistance to bending forces acting on the center area of the bumper box beam.

It will be noted that the upper shelf 14 and the lower shelf 15 of the face bar 12 terminate in longitudinally extending, vertically depending flanges 37 and 38. As best seen in FIG. 2, the upper and lower marginal portions 39 and 41, respectively, of the backplate 13, has a plurality of holes 42. The holes 42 are adapted to be aligned with corresponding apertures (not visible) in the flanges 37 and 38 of the face bar 12. Suitable bolts or rivets 43 may be used to secure the face bar 12 to the backplate 13 (see FIG. 5).

The flexible shield 18 concealing the underride stops 17 may be formed of lightweight sheet metal or plastic material. It is provided with an upper flange 44 having a plurality of bolt or rivet receiving apertures 45. The flexible shield flange 44 is bolted or riveted to the underside of the face bar 12 lower shelf 15.

It should be readily apparent the underride stops 17 result in a substantial saving in the amount of metal used in fabricating the face bar 12 and correspondingly in a reduction in weight over a bumper having the equivalent functional impact height.

Figure 9:
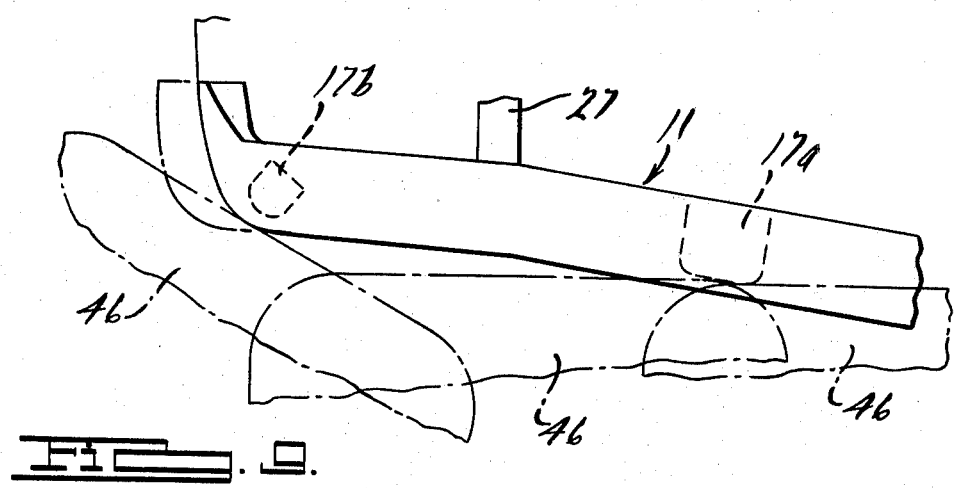
FIG. 9 is a schematic view of the bumper and its relationship to a standard test impact pendulum as viewed from the top of the bumper.
Figure 10:
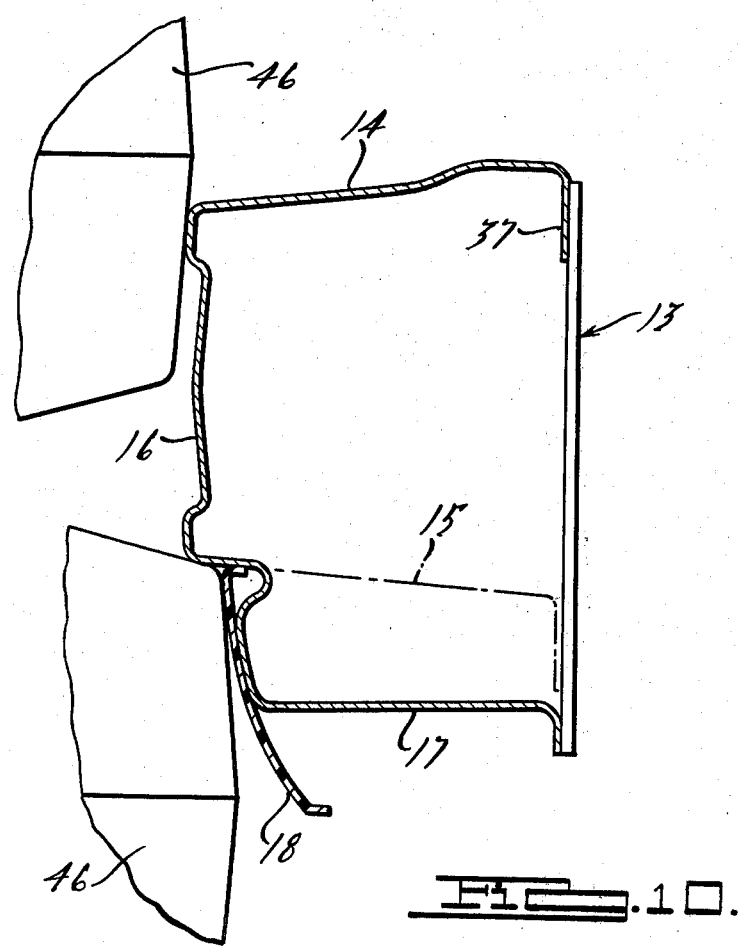
FIG. 10 is a schematic view illustrating the upper and lower positions of the test impact pendulum relative to the bumper embodying the present invention.

FIGS. 9 and 10 schematically indicate the importance of the number and placement of the underride stops 17. Federal motor vehicle safety standards require that bumper assemblies must be subjected to a federal pendulum test. The pendulum impact member is of a predetermined width and height. During the impact testing, the pendulum is horizontally and vertically shifted relative to the bumper assembly so that the impact area of the bumber assembly is varied. As shown in FIG. 9, the pendulum impact member 46 is relatively positionable horizontally along the longitudinal length of the bumper assembly. The contacting surface of the pendulum member 46 extends in a direction normal to the vehicle center line except at the corners of the bumper assembly at which the line of impact of the pendulum is along a line 30° to the vehicle center line.

The test pendulum 46 also can be raised and lowered relative to the vertical height of the bumper face bar 12 as depicted in FIG. 10. At its relative uppermost position, the impact of the pendulum is absorbed by the front face panel 16 of the face bar 12 independently of the underride stops 17. With the bumper assembly embodying the present invention, in the lowermost position of the pendulum impact member 46, the impact member underrides the lower shelf 15 of the face bar 12 only to be stopped by the underride stop 17. In the illustrated bumper embodiment, the two underride stops 17a nearest the center 47 of the bumper face bar 12 are equally spaced from the face bar center and the distance between the two does not exceed the flat length of the impact side of the pendulum member 46. When the vehicle center line and pendulum are offset relative to one another with only one end of the pendulum in alignment with the underride stop 17a, the bumper assembly remains functional in resisting the impact of the pendulum. When the pendulum impact member 46 underrides the bumper face bar 12 at either corner, the relevant underride stop 17b becomes functional.

In summary, the features of the bumper assembly embodying the present invention and the advantages derived may be listed in part as follows.

The reduced front face height beam has the advantage of reduced weight with improved beam strength, torsional stiffness and dent resistance; improved engine cooling capability and improved appearance and design flexibility.

The underride stops increase the functional height of the bumper assembly, improve formability of the bumper ends and improve engine cooling capability.

The bumper face bar can be fabricated to chrome plate steel to provide preferred appearance capability and reduced material cost.

The doubler plate provides increased dent resistance.

The truss backplate provides increased beam strength and torsional stiffness.

The lower extension or flexible shield provides conventional appearance and appearance flexibility for model differentiation and reduced cost and weight with integrated airdam, valance and air deflector functions.

It is to be understood that this invention is not limited to the exact construction illustrated and described above, but that various changes and modifications may be made without departing from the spirit and scope of the invention as defined in the appended claims.

We claim

1. A vehicle bumper having a "C" section face bar attached to a truss-formed backplate; the face bar having substantially horizontal upper and lower shelves of a width slightly in excess of the frontal face height of the face bar and of the backplate to form a substantially square box beam; wherein the improvement comprises:

a plurality of underride stops drawn from the lower shelf and extending substantially along the entire width thereof to vertically extend the impact functional height of the box beam; the stops providing low pendulum impact performance at minimal weight addition to the bumper.

2. A vehicle bumper according to claim 1, in which: an internal reinforcing doubler plate provides high dent resistance in the center frontal area of the bumper.

3. A vehicle bumper adapted to be supported on support struts mounted on a vehicle, comprising:

an elongated face bar of generally C-shaped cross-section having a substantially vertical face panel and substantially horizontal upper and lower shelves;

a backplate on which the face bar is mounted;

the face panel, the upper and lower shelves and the backplate forming a substantially square box beam;

the backplate having longitudinally spaced support strut attachment pads thereon;

a plurality of longitudinally spaced underride stops depending from the lower shelf to increase the functional height of the bumper;

an internal reinforcing doubler plate located within the bumper longitudinally between the attachment pads in abutting relation to the interior side of the face panel, extending essentially entirely between the upper and lower shelves of the face bar;

and an elongated flexible shield fastened to and extending the length of the face bar concealing the underride stops.

4. A vehicle bumper according to claim 3, in which: the doubler plate is C-shaped and complementarily fits within the C-shaped face bar at the center area of the latter between the support strut attachment pads;

and the doubler plate is fastened to the face bar upper and lower shelves.

5. A vehicle bumper according to claim 3 or 4, in which:

the backplate comprises an elongated truss providing increased beam strength and torsional stiffness to the bumper structure box beam.

6. A vehicle bumper according to claim 5, in which: spacer means of limited deformability mounted within the box beam on the reverse side of the support strut attachments extend into abutting relation to the inner surface of the vertical face panel of the face bar.

7. A vehicle bumper according to claim 3 or 4 in which:

spacer means of limited deformability mounted within the box beam on the reverse side of the support strut attachments extend into abutting relation to the inner surface of the vertical face panel of the face bar.

8. A vehicle bumper according to claim 3, in which: a minimum of four underride stops with two being equally spaced outwardly of the center of the bumper and another two being located one at each corner extremity of the bumper prevent underride of the federal test pendulum in any position of the same within the permitted horizontal displacement of the pendulum relative to the bumper center.

9. A vehicle bumper according to claim 8, in which: the corner underride stops are constructed and arranged to accommodate a test pendulum impact angle of 30° to the vehicle center line.

* * * * *